(12) United States Patent
Huang et al.

(10) Patent No.: US 10,759,162 B2
(45) Date of Patent: Sep. 1, 2020

(54) PRINTING HEAD MODULE

(71) Applicants: XYZprinting, Inc., New Taipei (TW); Kinpo Electronics, Inc., New Taipei (TW)

(72) Inventors: Chia-Hung Huang, New Taipei (TW); Ming-En Ho, New Taipei (TW); Chun-Hsiang Huang, New Taipei (TW); Jia-Yi Juang, New Taipei (TW); Yang-Teh Lee, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 609 days.

(21) Appl. No.: 15/464,357

(22) Filed: Mar. 21, 2017

(65) Prior Publication Data

US 2018/0133981 A1    May 17, 2018

(30) Foreign Application Priority Data

Nov. 16, 2016  (TW) .............................. 105137491 A (51) Int. Cl.
*B29C 64/209*    (2017.01)
*B29C 64/295*    (2017.01)
(Continued)

(52) U.S. Cl.
CPC ............... *B41J 2/01* (2013.01); *B29C 64/106* (2017.08); *B29C 64/209* (2017.08); *B29C 64/295* (2017.08); *B33Y 30/00* (2014.12)

(58) Field of Classification Search
None
See application file for complete search history.

(56) References Cited

U.S. PATENT DOCUMENTS

| 2002/0011693 A1* | 1/2002 | Leyden | B29C 41/12 264/401 |
| 2004/0175451 A1* | 9/2004 | Maekawa | B29C 41/36 425/144 |

(Continued)

FOREIGN PATENT DOCUMENTS

| CN | 1652939 | 8/2005 |
| CN | 101850619 | 10/2010 |

(Continued)

OTHER PUBLICATIONS

"Search Report of Europe Counterpart Application", dated Nov. 7, 2017, p. 1-p. 6.

(Continued)

*Primary Examiner* — Jacob T Minskey
*Assistant Examiner* — Baileigh Kate Darnell
(74) *Attorney, Agent, or Firm* — JCIPRNET (57) ABSTRACT

A printing head module for a 3-D printing apparatus includes a 3-D print head, an ink-jet print head and a baking module. The 3-D print head includes a melting module and a base-material nozzle to print a plurality of staking layers. The ink-jet print head is connected to the 3-D print head and includes an ink nozzle to dispense ink on each stacking layer. The baking module is disposed between the 3-D print head and the ink-jet print head and includes a fan, a discharge casing and a heating module. The fan includes an air-discharge side facing the base to provide an air flow. The discharge casing is disposed on the air-discharge side. The heating module is disposed between the fan and the discharge casing to heat the air flow and the heated air flow being blown out via the discharge casing for drying the ink layer.

12 Claims, 7 Drawing Sheets

(51) Int. Cl.
    *B29C 64/112*     (2017.01)
    *B01J 2/14*     (2006.01)
    *B41J 2/01*     (2006.01)
    *B29C 64/106*     (2017.01)
    *B33Y 30/00*     (2015.01)

(56) References Cited

U.S. PATENT DOCUMENTS

| | | | |
|---|---|---|---|
| 2004/0187714 A1* | 9/2004 | Napadensky | B29C 33/448 101/35 |
| 2006/0022379 A1* | 2/2006 | Wicker | B33Y 30/00 264/255 |
| 2006/0225834 A1* | 10/2006 | Medina | B33Y 70/00 156/273.3 |
| 2014/0242208 A1* | 8/2014 | Elsworthy | B29C 31/042 425/375 |
| 2015/0165676 A1* | 6/2015 | Chen | B29C 67/0085 425/170 |
| 2016/0096322 A1 | 4/2016 | Cheng et al. | |
| 2016/0101617 A1 | 4/2016 | Kulas | |
| 2016/0297110 A1* | 10/2016 | Wu | B29C 35/16 |

FOREIGN PATENT DOCUMENTS

| | | |
|---|---|---|
| CN | 102602125 | 7/2012 |
| CN | 104203580 | 12/2014 |
| CN | 204196260 | 3/2015 |
| CN | 104708816 | 6/2015 |
| CN | 104786510 | 7/2015 |
| CN | 104875382 | 9/2015 |
| CN | 204674198 | 9/2015 |
| CN | 104968500 | 10/2015 |
| CN | 105818369 | 8/2016 |
| EP | 2985134 | 2/2016 |
| JP | 2015112871 | 6/2015 |
| JP | 2015221568 | 12/2015 |
| KR | 20150081446 | 7/2015 |
| WO | 2016003277 | 1/2016 |

OTHER PUBLICATIONS

"Office Action of Japan Counterpart Application," dated Dec. 10, 2019, p. 1-p. 4.

"Office Action of China Counterpart Application", dated Jul. 3, 2019, pp. 1-9.

"Office Action of China Counterpart Application", dated Mar. 13, 2020, p. 1-p. 12.

"Office Action of Korea Counterpart Application" with English translation thereof, dated Apr. 24, 2020, p. 1-p. 12.

* cited by examiner

PRINTING HEAD MODULE

CROSS-REFERENCE TO RELATED APPLICATION

This application claims the priority benefit of Taiwan application serial no. 105137491, filed on Nov. 16, 2016. The entirety of the above-mentioned patent application is hereby incorporated by reference herein and made a part of this specification.

BACKGROUND

Technical Field

The disclosure relates to a printing head module, and particularly to a printing head module having a baking module.

Description of Related Art

With advancement in computer-aided manufacturing (CAM), a three dimensional printing technology (3-D printing technology) has been developed in the manufacturing industry, which can very quickly fabricate a physical solid object based on an original concept design. The 3-D printing, in fact, is a general term of a series of rapid prototyping technologies (RP technologies) and the basic principle thereof, and the concept thereof is a laminate manufacturing, where an RP machine scans a prototype work piece along an X-Y plane to obtain a cross-section shape of the work piece. Meanwhile, the probe intermittently displaces in Z coordinate with a step of a slice thickness layer by layer so as to ultimately form the 3-D object. The 3-D printing is unrestricted for the geometric shapes with the prototype, and the more complex the work piece is, the more excellences the RP technology shows so as to largely save the labor and the process time. As a result, a digital 3-D model given by the computer-aided design (CAD) can be truthfully revealed under a shortest time requirement, and the model is, not only palpable, but also truly felt for its geometric curves. The user can trial the assembling performance of the model, and even can do possible functional test thereof.

Take fused deposition modeling (FDM) as an example, it turns a forming material into wires and then heats and melts the forming material, so as to stack the material layer by layer on a forming stage according to the desired shape/contour to form a three-dimensional object. Therefore, in the conventional color fused deposition modeling three-dimensional printing method, the exterior is usually colored after the three-dimensional object is completed, or the three-dimensional object is manufactured by using a colored forming material. In the former case, however, the color ink is only applied to the outer surface of the three-dimensional object, which may be slightly inferior in color rendering and variability. In the latter case, single-color wire materials are usually used to form a colored object. Thus, the color rendering and variability may be inferior and it will be more difficult to form multiple colors (for example, it will be required to repeatedly switch to wire materials of different colors in order to achieve the effect of multiple colors). As a result, the efficiency of manufacturing a colored three-dimensional object is low.

SUMMARY

The disclosure provides a printing head module which renders a 3-D object with good color rendering and variability.

In the disclosure, the printing head module for being disposed above a base of a 3-D printing apparatus to print a 3-D object includes a 3-D print head, an ink-jet print head and a baking module. The 3-D print head includes a melting module and a base-material nozzle to melt and print a 3-D printing base material on the base to form a plurality of staking layers. The ink-jet print head is connected to the 3-D print head and includes an ink nozzle to dispense ink on each stacking layer to form a plurality of ink layers. The baking module is disposed between the 3-D print head and the ink-jet print head, and includes a fan module, a discharge casing and a heating module. The fan module includes an air-discharge side facing the base to provide an air flow. The discharge casing is disposed on the air-discharge side. The heating module is disposed between the fan module and the discharge casing to heat the air flow, and the air flow heated by the heating module is blown out of the discharge casing for baking and drying each ink layer on each stacking layer.

In the disclosure, the printing head module for being disposed above a base of a 3-D printing apparatus to print a 3-D object includes a 3-D print head, an ink-jet print head, a fan module and a baking module. The 3-D print head includes a melting module and a base-material nozzle to melt and print a 3-D printing base material on the base to form a plurality of staking layers. The ink-jet print head is connected to the 3-D print head and includes an ink nozzle to dispense ink on each stacking layer to form a plurality of ink layers. The fan module is disposed corresponding to a feeding channel of the 3-D print head to provide an air flow. The feeding channel is connected to the base-material nozzle. The baking module is disposed on an air-discharge side of the fan module and includes a discharge casing. The discharge casing is disposed to face the base. The air flow flows into the feeding channel to be heated, and blown out of the discharge casing for baking and drying each ink layer on each stacking layer.

In light of the foregoing, the printing head module of the disclosure further includes the ink-jet print head and baking module. Accordingly, after the 3-D print head prints out the stacking layers on the base, the stacking layers may be colored by using the ink-jet print head to dispense the ink layer on each of the stacking layers. Subsequently, the baking module may be used to bake and dry the ink layer to form colored stacking layers. The stacking layers and the ink layers are stacked alternately on top of one another to form a colored 3-D object. With the printing head module of the disclosure, the colored 3-D object may be printed without repeatedly switching 3-D printing base materials with different colors. In the meantime, the disclosure adopts the ink-jet print head to dispense ink for coloring the stacking layers, whereby the color rendering and variety of the 3-D object may be effectively improved. Accordingly, the printing head module of the disclosure may effectively enhance printing quality and design flexibility.

In order to make the aforementioned features and advantages of the disclosure more comprehensible, embodiments accompanying figures are described in detail below.

DESCRIPTION OF EMBODIMENTS

The above-mentioned or other relevant technical principles and the features and effects thereof are clearly presented together with the accompanying drawings in the following depicted embodiments. Note that some of expression words hereinafter regarding direction or orientation, such as 'top', 'bottom', 'front', 'behind', 'left', 'right', and the like, are directions for references in the attached drawings which are to describe, not to limit, the present disclosure. In addition, in the following embodiments, a same notation or a similar notation is for marking the same or the similar portion.

Figure 1:
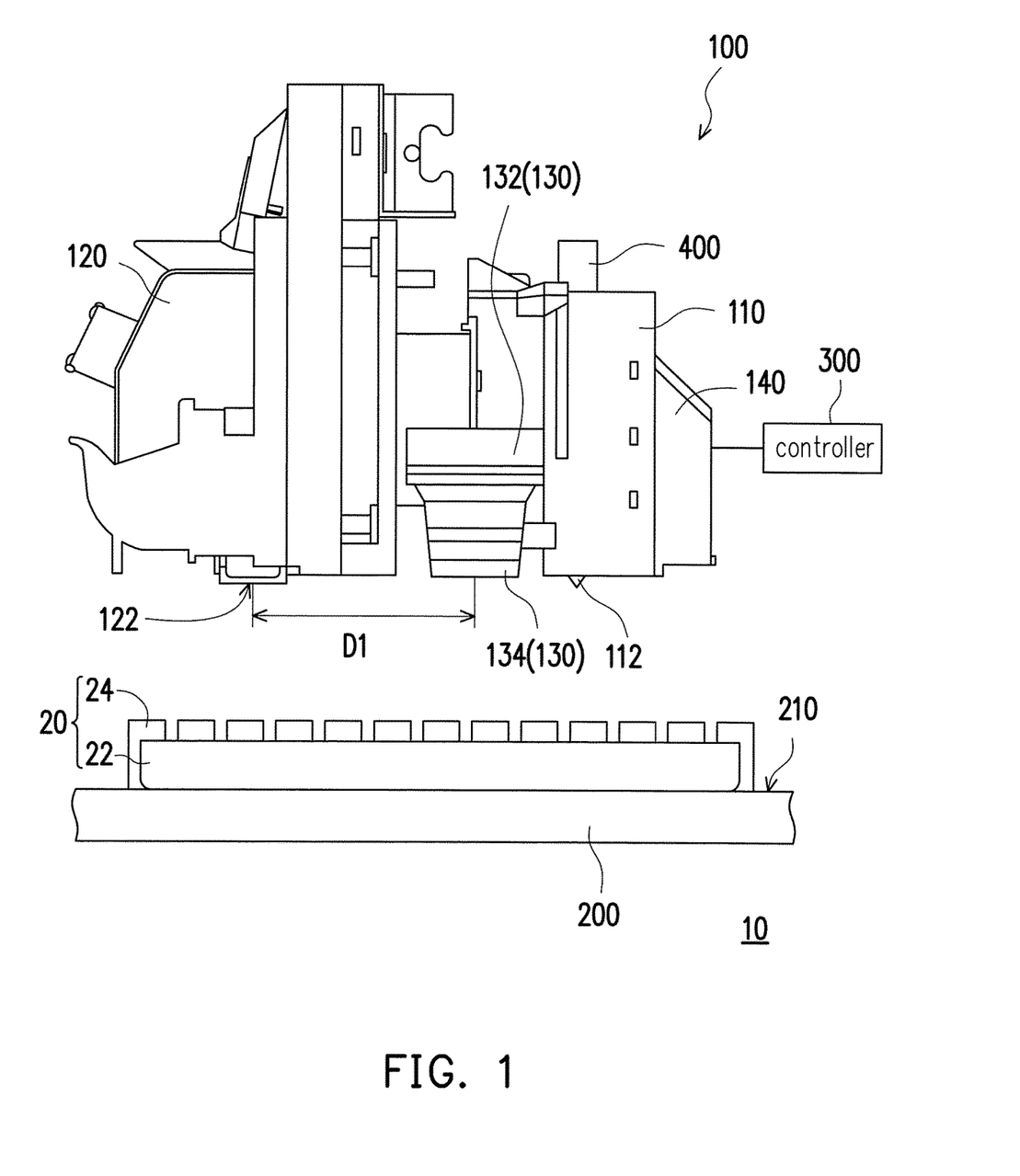
FIG. 1 is a schematic view illustrating a printing head module according to an embodiment of the disclosure.
Figure 2:
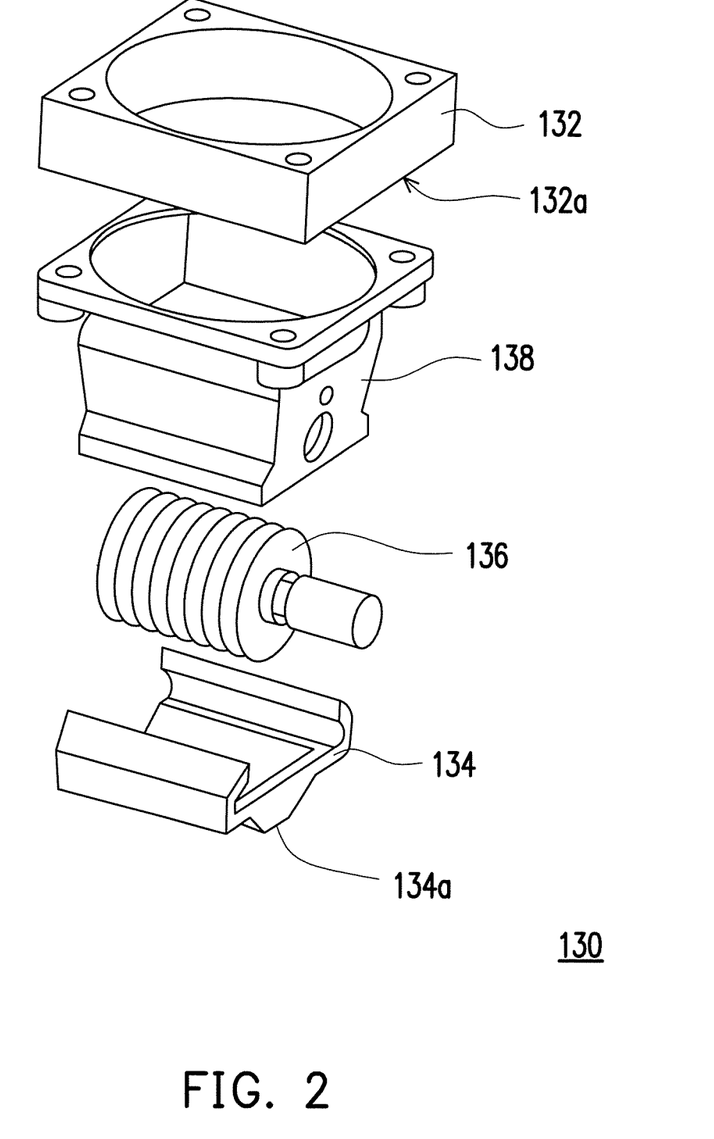
FIG. 2 is an explosive view illustrating elements of a baking module according to an embodiment of the disclosure.

FIG. 1 is a schematic view illustrating a printing head module according to an embodiment of the disclosure. FIG. 2 is an explosive view illustrating elements of a baking module according to an embodiment of the disclosure. Referring to both of FIGS. 1 and 2, in the embodiment, a printing head module 100 is configured for being disposed on a 3-D printing apparatus 10 to print a 3-D object 20 according to a digital 3-D model. The 3-D printing apparatus 10 includes a printing head module 100 and a base 200. The printing apparatus 10 includes a printing head module 100 and a base 200. The printing head module 100 is movably disposed above the base 200. In the embodiment, the 3-D printing apparatus 10 may further include a controller 300 for reading the digital 3-D model and controlling the printing head module 100 to move relative to the base 200. The digital 3-D model may be a digital 3-D image file which is built by a computer host via, for example, computer-aided design (CAD) or animation modeling software and the like.

Furthermore, the base 200 has a carry surface 210 for carrying stacking layers 22 and ink layers 24 printed by the printing head module 100. The printing head module 100 is disposed above the base 200. Specifically, in the embodiment, the 3-D printing apparatus 10 may further include a 3-D printing base material 400 connected to the printing head module 100 as shown in FIG. 1, which is configured for entering a base-material nozzle 112 via a feeding channel of the printing head module 100 to be heated and melted, and extruded by the base-material nozzle 112 layer by layer on the carry surface 210 of the base 200 to form a plurality of stacking layers 22. With such configuration, the stacking layers 22 formed by layers are stacked on top of one another on the carry surface 210 to form the 3-D object 20. Specifically, the 3-D printing base material 400 may include a thermal plastic material applicable to printing methods such as Fused Filament Fabrication (FFF) method, Melted and Extrusion Modeling method and the like.

In detail, the 3-D printing apparatus 10 of the embodiment includes the base 200 and the printing head module 100. The printing head module 100 includes the 3-D print head 110, the ink-jet print head 120 and a baking module 130. The base 200 has a carry surface 210. The 3-D print head 110 is disposed above the carry surface 210 of the base 200, and the 3-D print head 110 includes a base-material nozzle 112 and a melting module 114. The melting module 114 is configured to melt the 3-D printing base material 400. Thereafter, the base-material nozzle 112 prints the melted 3-D printing base material 400 on the carry surface 210 of the base 200 to form a plurality of stacking layers 22 as shown in FIG. 1. The ink-jet print head 120 is disposed above the carry surface 210 and connected to the 3-D print head 110. The baking module 130 is disposed between the 3-D print head 110 and ink-jet print head 120. Specifically, the 3-D print head 110, baking module 130 and ink-jet print head 120 may be connected to one another along a direction parallel with the carry surface 210.

In the embodiment, the ink-jet print head 120 includes an ink nozzle 122 to dispense ink on each stacking layer 22 to form a plurality of ink layers 24. In the embodiment, the ink dispensed by the ink-jet print head 120 may be colored ink. With such configuration, in the embodiment, after the 3-D print head 110 prints a staking layer 22 on the base 200, the ink-jet print head 120 may dispense the ink layer 24 onto an upper surface and a side surface of the stacking layer 22 to color the stacking layer 22. Thereafter, the baking module 130 may be adopted to bake and dry the ink layer 24 to form the colored stacking layer 22. The steps described above may be performed repeatedly to form a plurality of stacking layers 22 and a plurality of ink layers 24 stacked alternately on top of one another, so as to form the 3-D object 20. As such, the 3-D print head 110 may print the colored 3-D object 20 without repeatedly switching between the 3-D printing base materials 400 with different colors.

In the embodiment, as shown in FIG. 2, the baking module 130 includes a fan module 132, a discharge casing 134 and a heating module 136. The fan module 132 includes an air-discharge side 132a facing the carry surface 210 to provide an air flow to the carry surface 210. The discharge casing 134 is disposed on the air-discharge side 132a. The heating module 136 is disposed between the fan module 132 and discharge casing 134 to heat the air flow, and the heated air flow is blown out of the discharge casing 134; therefore, the heated air flow can be used to bake and dry the ink layer 24 on each stacking layer 22. In the embodiment, the temperature of air flow heated by the heating module 136 is from about 65° C. to 70° C. In addition, the baking module 130 may further include a housing 138, and the heating module 136 is disposed in the housing 138. The fan module 132 and discharge casing 134 are respectively disposed on two opposite sides of the housing 138. Furthermore, the fan module 132 of the embodiment is fixed to the housing 138 by the air-discharge side 132a via fixing components such as a plurality of screws.

With such configuration, the embodiment may adopt the controller 300 coupled to the printing head module 100 to control the printing head module 100 to move in a manner of the 3-D print head 110 as a datum point of the movement, such that the 3-D print head 110 prints the stacking layer 22 on the carry surface 210. Then, the printing head module 100 is controlled to move in a manner of the ink-jet print head 120 as a datum point of the movement, such that the ink-jet print head 120 dispenses the ink layer 24 on each staking layer 22. Next, the printing head module 100 is controlled to move in a manner of the baking module 130 as a datum point of the movement, such that the baking module 130 bakes and dries the ink layer 24 on the stacking layer 22 along a dispensing path of the ink-jet print head 120. By repeating the steps described above, the stacking layers 22 and ink layers 24 stacked alternately on top of one another are sequentially formed to build the 3-D object 20.

In the embodiment, a certain distance must be maintained between an outlet 134a (i.e. air outlet) of the discharge casing 134 and the ink nozzle 122 of the ink-jet print head 120 to prevent the air flow blown out of the baking module 130 from drying the ink in the ink-jet print head 120, which jams the ink nozzle 122. Accordingly, in the embodiment, the shortest horizontal distance D1 between the outlet 134a of the discharge casing 134 and the ink nozzle 122 of the ink-jet print head 120 is about at least larger than 35 mm. In addition, as shown in FIG. 1, the shortest horizontal distance D1 between the outlet 134a of the discharge casing 134 and the ink nozzle 122 of the ink-jet print head 120 is from about 35 mm to 50 mm.

Figure 3:
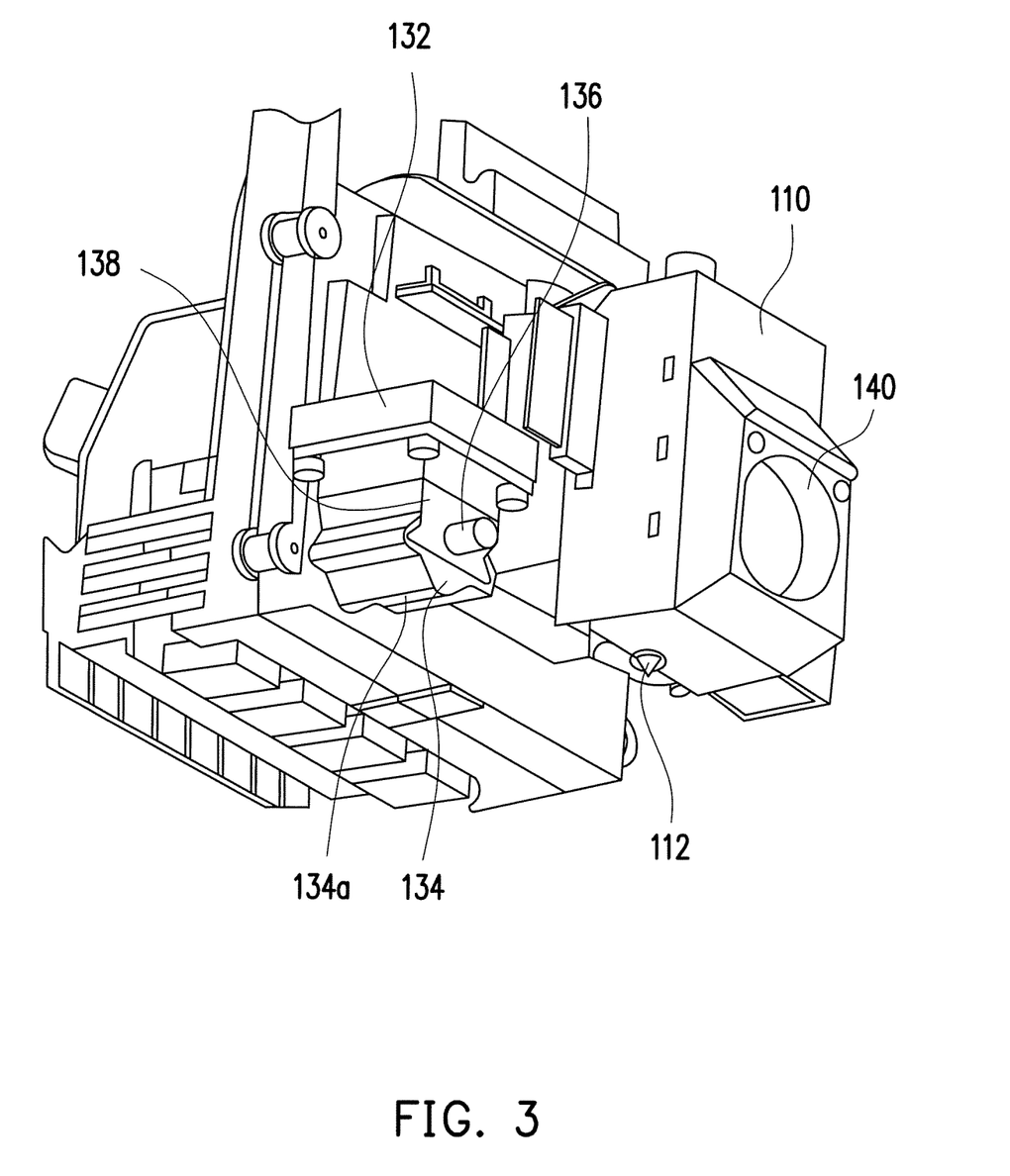
FIG. 3 is a schematic view illustrating partial elements of a printing head module according to an embodiment of the disclosure.
Figure 4:
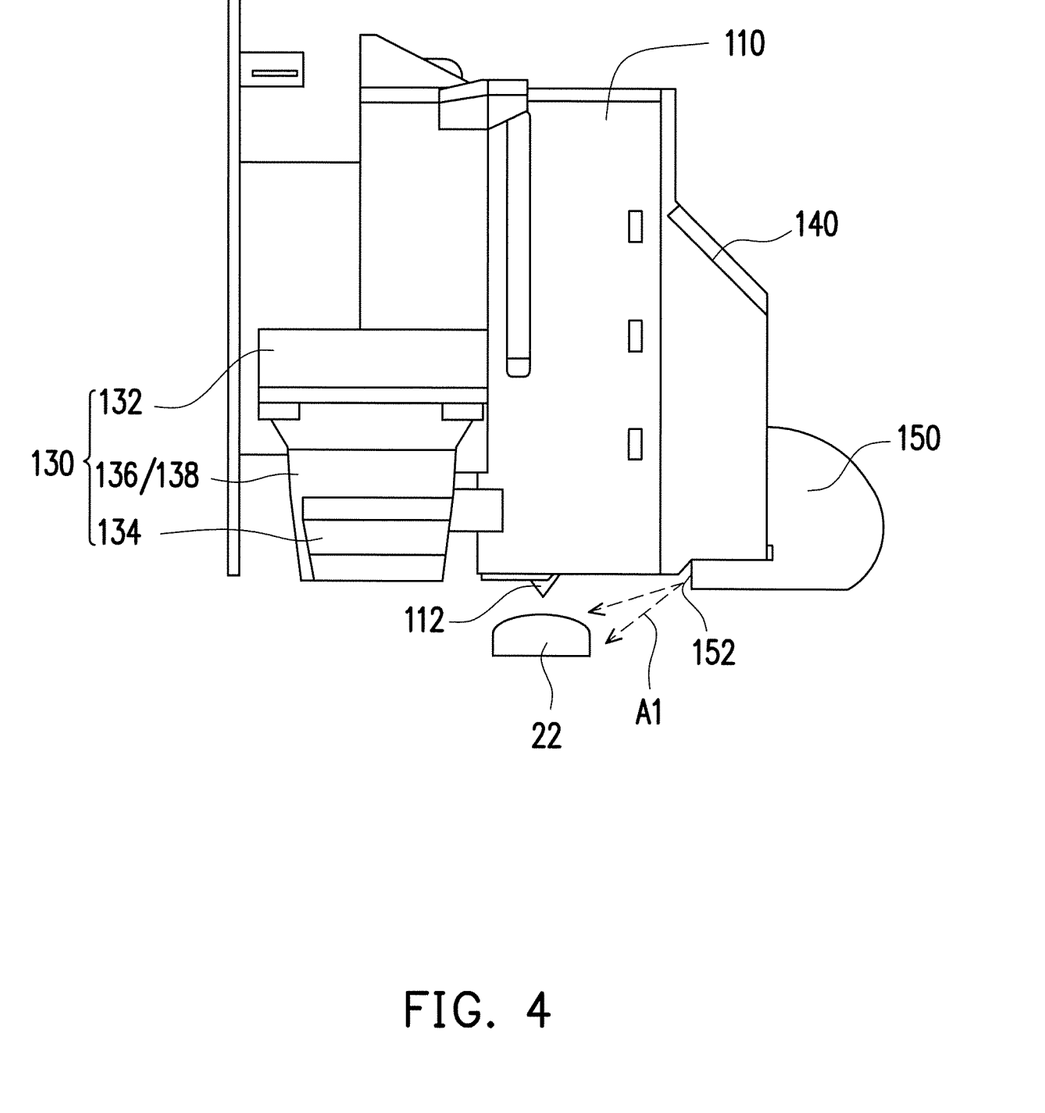
FIG. 4 is a schematic view illustrating printing operation performed by a printing head module according to an embodiment of the disclosure.
Figure 5:
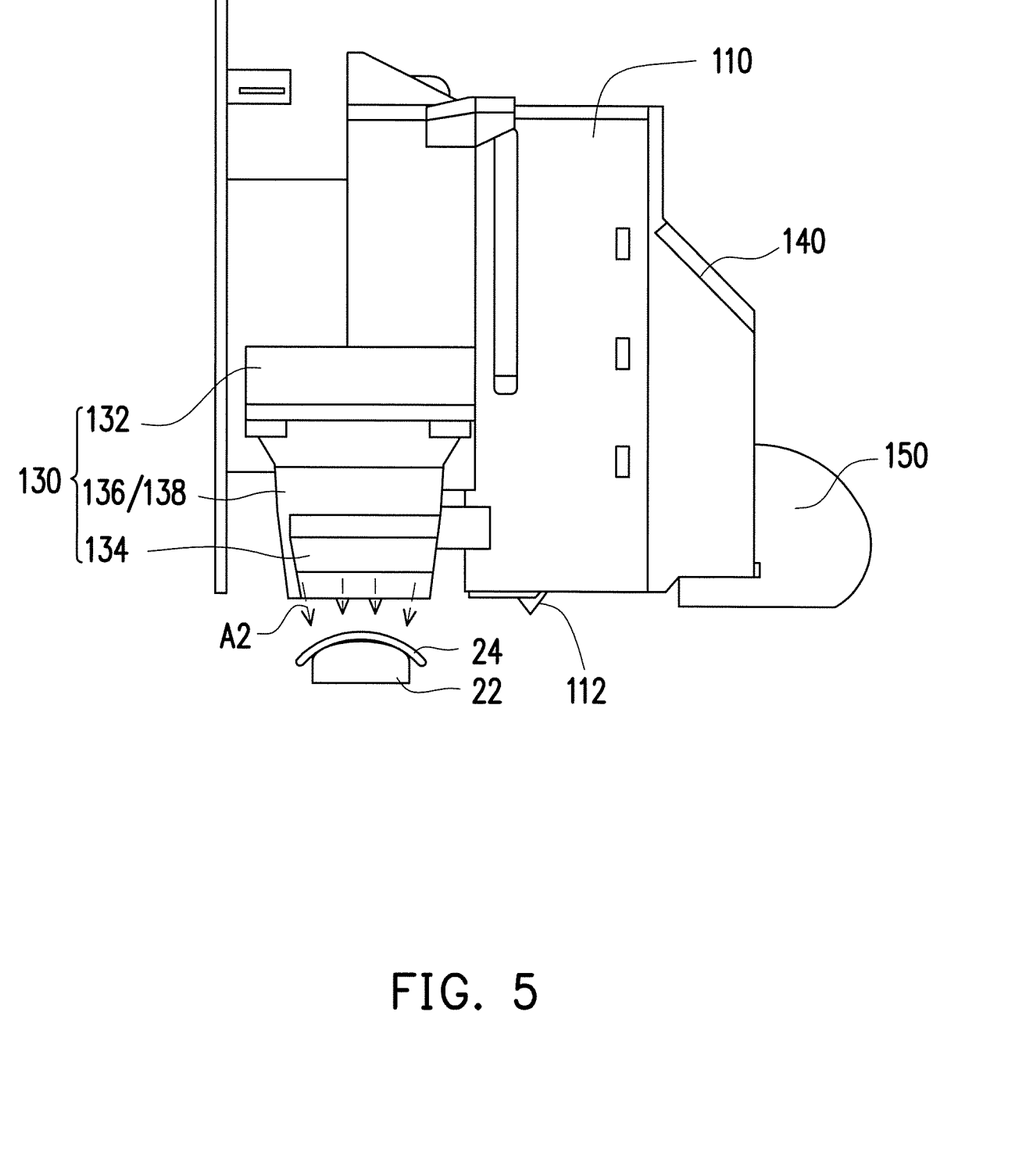
FIG. 5 is a schematic view illustrating baking operation performed by a printing head module according to an embodiment of the disclosure.

FIG. 3 is a schematic view illustrating partial elements of a printing head module according to an embodiment of the disclosure. FIG. 4 is a schematic view illustrating printing operation performed by a printing head module according to an embodiment of the disclosure. FIG. 5 is a schematic view illustrating baking operation performed by a printing head module according to an embodiment of the disclosure. Referring to FIGS. 3 to 5, in the embodiment, the printing head module 100 may further include a heat-dissipation fan 140 and a nozzle air duct 150 as shown in FIG. 4. The heat-dissipation fan 140 is disposed corresponding to a feeding channel of the 3-D print head 110. The feeding channel is connected to the base-material nozzle 112 to transmit the 3-D printing base material 400 to the base-material nozzle 112. The nozzle air duct 150 is disposed corresponding to the heat-dissipation fan 140, and includes a nozzle air outlet 152. The nozzle air outlet 152 is disposed between the base-material nozzle 112 and the carry surface 210 of the base 200. With such configuration, the heat-dissipation fan 140 may provide a cooling air flow A1 which flows into the nozzle air outlet 152 of the nozzle air duct 150 via the feeding channel. Therefore, the cooling air flow A1 that flows through the feeding channel may be firstly heated and then flows out of the nozzle air outlet 152. In the embodiment, the nozzle air outlet 152 may be disposed at a position corresponding to the 3-D object 20 on the carry surface 210 so as to indirectly cool down the 3-D printing base material 400 (the stacking layers 22) extruded on the carry surface 210 by the base-material nozzle 112, so as to slow down the cooling and curing speed of the 3-D object 20, thereby preventing the 3-D object 20 from cracking due do rapid cooling. In the embodiment, the temperature of the cooling air flow A1 flowing out of the nozzle air outlet 152 is approximately lower than the temperature of the air flow A2 (provided by the fan module 132) heated by the heating module 136. For example, the temperature of the cooling air flow A1 flowing out of the nozzle air outlet 152 is from about 30° C. to 50° C., whereas the temperature of the air flow A2 (provided by the fan module 132) heated by the heating module 136 is from about 65° C. to 70° C.

In addition, the cooling air flow A1 provided by the heat-dissipation fan 140 flows through the feeding channel of the 3-D print head 110 first to cool down the feeding channel. Subsequently, the cooling air flow flowing through the feeding channel with higher temperature flows into the nozzle air duct 150 to be cooled down in the nozzle air duct 150. Finally, the cooling air flow A1 that is slightly cooler flows into the nozzle air outlet 152 to cool down the stacking layer 22 extruded by the base-material nozzle 112. In other words, the cooling air flow A1 initially provided by the heat-dissipation fan 140 has a first temperature; the cooling air flow A1 flowing through the feeding channel has a second temperature, and the second temperature is higher than the first temperature. Finally, the cooling air flow A1 flowing out of the nozzle air outlet 152 has a third temperature, and the third temperature ranges between the first temperature and second temperature. For example, the first temperature is from about 20° C. to 30° C.; the second temperature is about 100° C.; the third temperature is from about 30° C. to 70° C. Accordingly, the printing head module 100 in the embodiment may adopt the cooling air flow A1 provided by the heat-dissipation fan 140, which has lower temperature, to directly dissipate the heat of the feeding channel 220, and then adopt the cooling air flow A1 flowing through the feeding channel 220, which has higher temperature, to cool down the stacking layer 22 extruded by the base-material nozzle 112 so as to prevent the 3-D object 20 from cracking due to rapid cooling.

Figure 6:
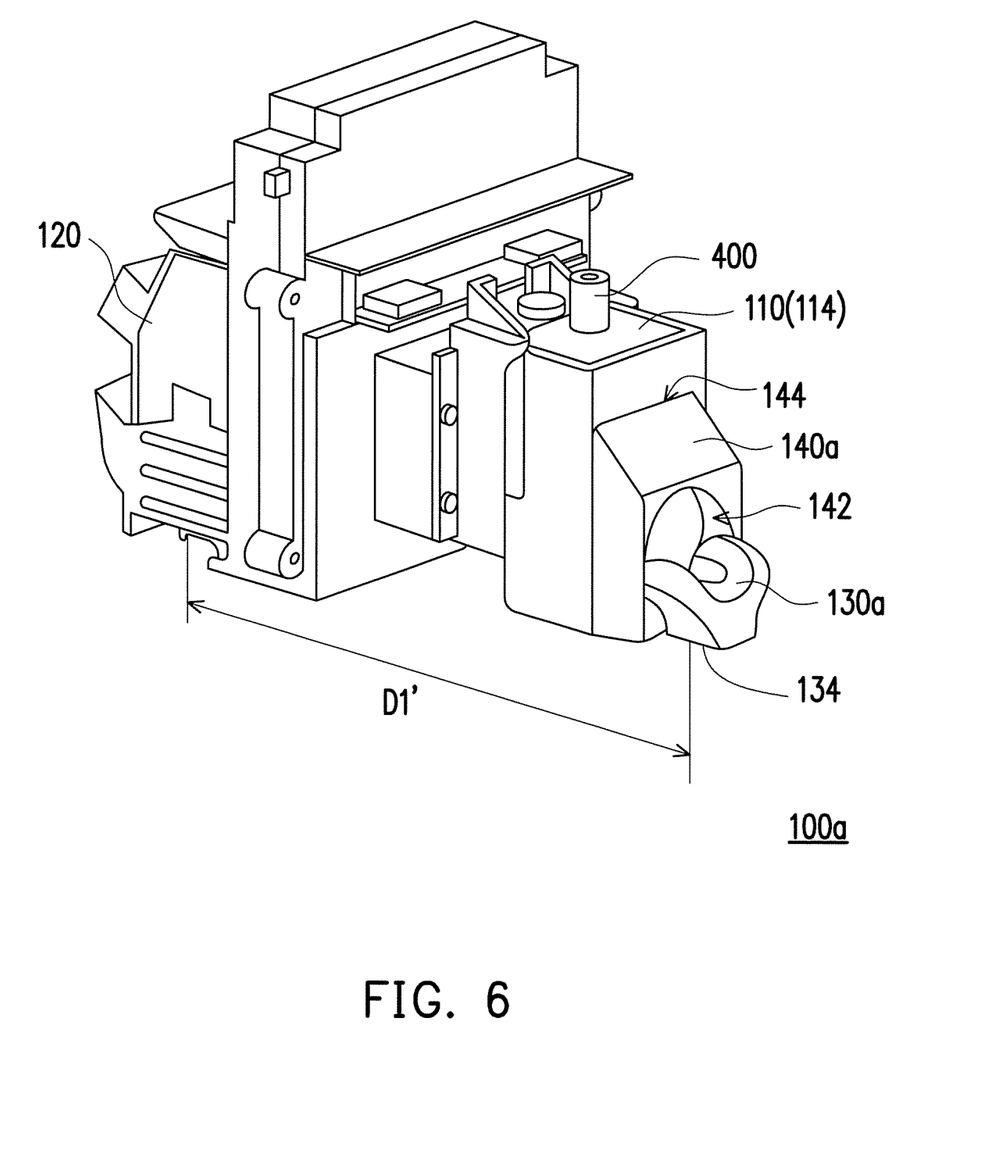
FIG. 6 is a schematic view illustrating a printing head module according to another embodiment of the disclosure.
Figure 7:
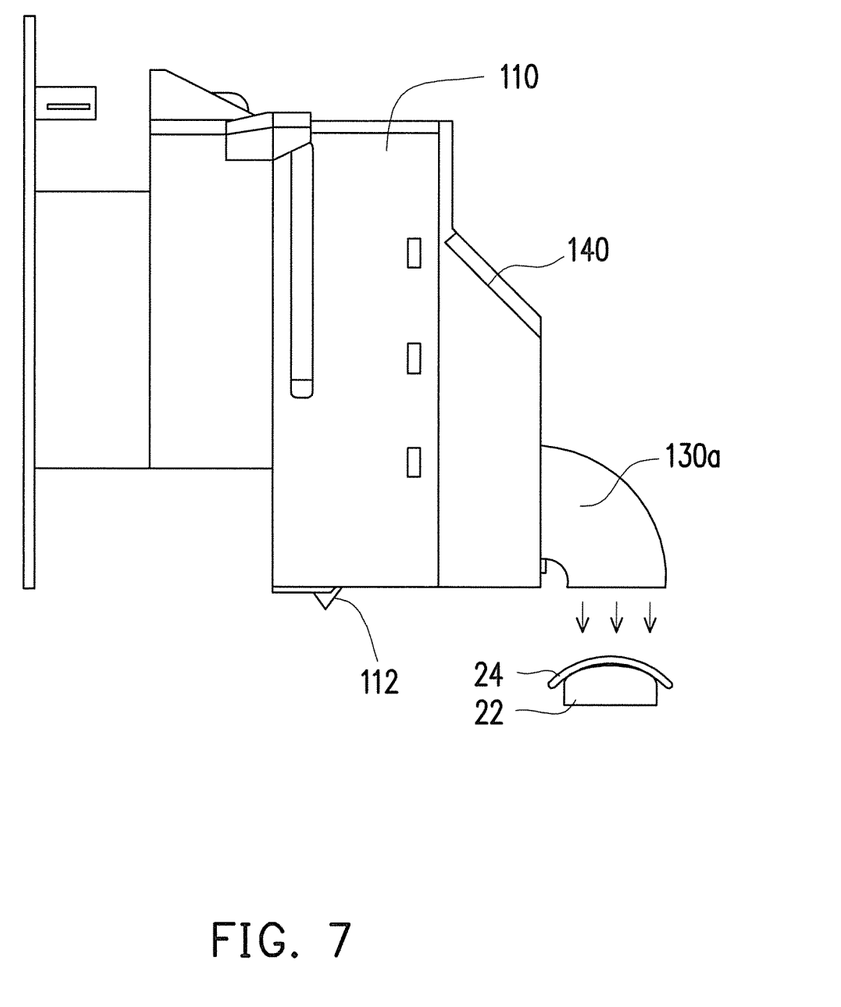
FIG. 7 is a schematic view illustrating baking operation performed by the printing head module in FIG. 6.

FIG. 6 is a schematic view illustrating a printing head module according to another embodiment of the disclosure. FIG. 7 is a schematic view illustrating baking operation performed by the printing head module in FIG. 6. It is noted that a printing head module 100a in the embodiment is similar to the printing head module 100 in FIG. 1. Therefore, the embodiment adopts partial descriptions in the previous embodiment as well as the same or similar reference numbers to denote the same or similar elements; meanwhile, the same technical content is omitted. Please refer to the previous embodiment for the details of omitted descriptions; no repetition is incorporated herein. Referring to FIGS. 6 to 7, the following paragraph is dedicated to describing the difference between the printing head module 100a in the embodiment and the printing head module 100 in FIG. 1.

A printing head module 100a in the embodiment includes a 3-D print head 110, an ink-jet print head 120, a fan module 140a and a baking module 130a. In the embodiment, the fan module 140a is disposed corresponding to a feeding channel of the 3-D print head 110 to provide an air flow. In the embodiment, the fan module 140a is fixed to the feeding channel of the 3-D print head 110 by an air-inlet side 144 relative to the air-discharge side 142 of the fan module 140a. That is to say, the fan module 140a dissipates heat by extracting air, such that the air flow flows through the feeding channel to be heated and then is discharged via the air-discharge side 142.

Meanwhile, the baking module 130a is disposed on the air-discharge side 142 of the fan module 140a and includes a discharge casing 134. The discharge casing 134 faces the carry surface (e.g. the carry surface 210 as shown in FIG. 1) of the base. Accordingly, the air flow flows through the feeding channel to be heated, and the air flow heated by the feeding channel is discharged via the air-discharge side 142. At least a portion of the air flow enters the baking module 130a and is blown out via the discharge casing 134, such that the heated air flow is used to bake and dry each of the ink layers 24 on each of the stacking layers 22 on the carry surface. With such configuration, the printing head module 100a in the embodiment may adopt the air flow provided by the fan module 140a, which has lower temperature, to directly dissipate the heat of feeding channel. The air flow that flows through the feeding channel, which has higher temperature, is guided to the baking module 130a and blown out by the discharge casing 134 facing the carry surface so as to bake and dry each ink layer 24 on each stacking layer 22 on the carry surface. Briefly, since the embodiment directly utilizes the recycled air flow, which dissipates the heat of feeding channel, to dry the ink layers 24, there is no need to dispose a heat-dissipation module and an additional fan. Therefore, the configuration of the elements in the embodiment is simplified. Furthermore, in the embodiment, the shortest horizontal distance D1' between an outlet of the discharge casing 134 and the ink nozzle of the ink-jet print head 120 may be longer than 50 mm to further prevent the air flow blown out of the baking module 130a from drying the ink in the ink-jet print head 120 and causing the ink-jet print head being jammed.

In summary of the above, the printing head module in the disclosure further includes the ink-jet print head and baking module. Accordingly, after the 3-D print head prints the staking layer on the base, the ink-jet print head is adopted to dispense ink layer on the stacking layer to color the stacking layer. Thereafter, the baking module may be used to bake and dry the ink layer to form the colored stacking layer. In an embodiment, the baking module includes the fan, the discharge casing and heating module. The heating module is disposed between the fan and discharge casing to heat the air flow provided by the fan and the heated air flow is blown out via the discharge casing so as to bake and dry each ink layer on each stacking layer. Accordingly, the stacking layers and the ink layers are alternately stacked on top of one another to form colored 3-D object. In another embodiment, the fan module may be disposed on the feeding channel of the 3-D print head to provide air flow with lower temperature to directly dissipate the heat of the feeding channel. Moreover, the baking module is configured to guide the heated air flow flowing through the feeding channel to the discharge casing and the heated air flow is blown out toward the base, so as to bake and dry the ink layer. Accordingly, the printing head module of the disclosure may print the colored 3-D object without repeatedly switching between 3-D printing base materials with different colors. Moreover, the disclosure utilizes the ink-jet print head to dispense ink to color the stacking layer, which can effectively enhance color rendering and variability of the 3-D object. Accordingly, the printing head module of the disclosure can effectively improve printing quality as well as design flexibility.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A printing head module for being disposed above a base of a 3-D printing apparatus to print a 3-D object, comprising:
    a 3-D print head, comprising a melting module and a base-material nozzle to melt and print a 3-D printing base material on the base to form a plurality of stacking layers;
    an ink-jet print head, connected to the 3-D print head, wherein the ink-jet print head comprises an ink nozzle to dispense an ink on each of the stacking layers to form a plurality of ink layers; and
    a baking module, disposed between the 3-D print head and the ink-jet print head and comprising:
        a fan module, comprising an air-discharge side facing the base to provide an air flow;
        a discharge casing, disposed on the air-discharge side; and
        a heating module, disposed between the fan module and the discharge casing to heat the air flow, and the air flow heated by the heating module being discharged via the discharge casing to bake and dry each of the ink layers on each of the stacking layers,
    wherein the baking module further comprises a housing, the heating module is disposed within the housing, and the fan module and the discharge casing are disposed on two opposite sides of the housing.

2. The printing head module according to claim 1, wherein the fan module is fixed to the housing by the air-discharge side.

3. The printing head module according to claim 1, wherein a shortest horizontal distance between an outlet of the discharge casing and the ink nozzle is from 35 mm to 50 mm.

4. The printing head module according to claim 1, wherein a temperature of the air flow heated by the heating module is from 65° C. to 70° C.

5. The printing head module according to claim 1, further comprising:
    a heat-dissipation fan, disposed corresponding to a feeding channel of the 3-D print head, wherein the feeding channel is connected to the base-material nozzle; and
    a nozzle air duct, disposed corresponding to the heat-dissipation fan and comprising a nozzle air outlet, the nozzle air outlet located between the base-material nozzle and the base.

6. The printing head module according to claim 5, wherein the nozzle air duct is connected to the air-discharge side of the heat-dissipation fan.

7. The printing head module according to claim 5, wherein the nozzle air outlet corresponds to the 3-D object to cool down the 3-D printing base material extruded by the base-material nozzle.

8. The printing head module according to claim 5, wherein a temperature of a cooling air flow flowing out of the nozzle air outlet is lower than a temperature of the air flow heated by the heating module.

9. The printing head module according to claim 5, wherein a temperature of the cooling air flow flowing out of the nozzle air outlet is from 30° C. to 50° C.

10. A printing head module for being disposed above a base of a 3-D printing apparatus to print a 3-D object, comprising:
    a 3-D print head, disposed above the base and comprising a melting module and a base-material nozzle to melt and print a 3-D printing base material on the base and form a plurality of stacking layers;
    an ink jet print head, disposed above the base and connected to the 3-D print head, the ink-jet print head comprising an ink nozzle to dispense an ink on each of the stacking layers to form a plurality of ink layers;
    a fan module, disposed corresponding to a feeding channel of the 3-D print head to provide an air flow, wherein the feeding channel is connected to the base-material nozzle; and
    a baking module, disposed on an air-discharge side of the fan module and comprising a discharge casing, the discharge casing facing the base, the air flow flowing through the feeding channel to be heated and the air flow heated by the feeding channel being blown out via the discharge casing to bake and dry each of the ink layers on each of the stacking layers,
    wherein the fan module is fixed to the feeding channel by an air-inlet side opposite to the air-discharge side.

11. The printing head module according to claim 10, wherein a shortest horizontal distance between an outlet of the discharge casing and the ink nozzle is larger than 50 mm.

12. The printing head module according to claim 10, wherein a temperature of the air flow heated by the feeding module is between 65° C. to 70° C.

\* \* \* \* \*